US00RE45815E

(19) United States
(12) Reissued Patent
Nitsche et al.

(10) Patent Number: US RE45,815 E
(45) Date of Reissued Patent: Dec. 1, 2015

(54) METHOD FOR SIMPLIFIED REAL-TIME DIAGNOSES USING ADAPTIVE MODELING

(75) Inventors: Christof Nitsche, Strassenhaus (DE); Stefan Schroedl, San Francisco, CA (US); Wolfgang Weiss, Oakland, CA (US)

(73) Assignee: RAMSLE TECHNOLOGY GROUP GMBH, LLC, Wilmington, DE (US)

(21) Appl. No.: 12/291,990

(22) Filed: Nov. 14, 2008 (Under 37 CFR 1.47)

Related U.S. Patent Documents

Reissue of:
(64) Patent No.: 7,136,779
Issued: Nov. 14, 2006
Appl. No.: 10/855,315
Filed: May 28, 2004

(51) Int. Cl.
*G06F 11/30* (2006.01)
*G05B 23/02* (2006.01)

(52) U.S. Cl.
CPC ..... *G05B 23/0229* (2013.01); *G05B 23/0235* (2013.01)

(58) Field of Classification Search
USPC ..... 702/35, 41, 66, 67, 71, 81, 84, 113, 702/145, 182, 183, 181; 703/7, 8, 17, 18
See application file for complete search history.

(56) References Cited

U.S. PATENT DOCUMENTS 4,663,703 A * 5/1987 Axelby et al. ..... 700/29
5,024,801 A * 6/1991 Impink et al. ..... 376/217
5,247,445 A * 9/1993 Miyano et al. ..... 701/115
5,355,749 A * 10/1994 Obara et al. ..... 477/20
5,682,317 A * 10/1997 Keeler et al. ..... 701/101
5,898,282 A * 4/1999 Drozdz et al. ..... 318/139
6,085,183 A * 7/2000 Horn et al. ..... 706/45
6,108,648 A * 8/2000 Lakshmi et al. ..... 1/1
6,574,613 B1 * 6/2003 Moreno-Barragan ..... 706/16
6,609,051 B2 8/2003 Fiechter et al. ..... 701/33
6,625,539 B1 * 9/2003 Kittell et al. ..... 701/213
6,760,716 B1 * 7/2004 Ganesamoorthi et al. ..... 706/21
6,792,341 B2 * 9/2004 Hunt et al. ..... 701/22
6,837,115 B2 * 1/2005 Mansky ..... 73/862.046
6,847,881 B2 * 1/2005 Melbert ..... 701/103
6,893,756 B2 * 5/2005 Clingerman et al. ..... 429/22
6,909,959 B2 * 6/2005 Hallowell ..... 701/88
7,035,834 B2 * 4/2006 Jacobson ..... 706/26
7,136,779 B2 * 11/2006 Nitsche et al. ..... 702/183
7,136,860 B2 * 11/2006 Doliov ..... 1/1
7,183,962 B1 * 2/2007 Roo et al. ..... 341/155
7,308,322 B1 * 12/2007 Discenzo et al. ..... 700/28
7,539,597 B2 * 5/2009 Wegerich et al. ..... 702/185
7,613,663 B1 * 11/2009 Commons et al. ..... 706/15
7,860,682 B2 * 12/2010 Hamilton et al. ..... 702/183
8,260,733 B2 * 9/2012 Sullivan et al. ..... 706/21
2002/0092988 A1 * 7/2002 Didomenico et al. ..... 250/338.5
2003/0014131 A1 * 1/2003 Havener et al. ..... 700/29
2005/0119842 A1 * 6/2005 Clingerman et al. ..... 702/63
2009/0073021 A1 * 3/2009 Lee et al. ..... 341/161

* cited by examiner

*Primary Examiner* — Mary Steelman

(57) ABSTRACT

A method for on-board real-time diagnostics of a mobile technical system using an adaptive technique to approximate stationary characteristic curves resulting from a workshop test. This adaptive technique uses observed non-stationary normal driving data to eliminate confounding variables.

32 Claims, 3 Drawing Sheets

METHOD FOR SIMPLIFIED REAL-TIME DIAGNOSES USING ADAPTIVE MODELING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a reissue of U.S. patent application Ser. No. 10/855,315 (now U.S. Pat. No. 7,136,779), filed May 28, 2004, which is hereby incorporated by reference.*

BACKGROUND AND SUMMARY OF THE INVENTION

The present invention relates to on-board real-time diagnostics of mobile technical systems.

In order to detect faults or monitor ageing processes in vehicle systems, the normal procedure involves bringing the system into a mechanical workshop where the behavior can be tested using predefined and controlled conditions. Design tolerances and references can then be compared with measured variables to provide an accurate estimate concerning not only individual items but also the overall functioning and degradation of the system.

An internal combustion engine can be characterized by an engine speed/torque curve. A corresponding analysis tool for a fuel cell powertrain is a polarization curve as shown in FIG. 2. This polarization curve shows the effect of discharging current from a fuel cell system on the cell voltage and power. The curve is usually derived from a specifically designed dynamometer test cycle where the current and voltage are recorded at predefined static load points. The polarization curve, such as shown FIG. 2, results from an interpolation of those static load points.

The present invention results from a recognition that accomplishing of this diagnostics on an on-board component in real-time during normal driving would be a valuable tool not only for customers and field technicians, but also for development engineers. The ability to have a real-time diagnostics would lead to lower maintenance cost, faster problem resolution and shorter design cycles. It has also been recognized that the task of such on-line diagnostics is very complex with a principle obstacle being the range of varying dynamic influences. For example, with fuel cell stacks, the operational temperature, air/hydrogen gas temperatures and pressures inside the stack and the recordings of the fuel cell voltage and current lead to a range of uncertainty of the measurement points instead of more defined points recorded at predefined static loads. This comparison can be seen in FIG. 3 which compares work bench test data with data during normal driving.

This range of uncertainty in the factors can be attributed to both the external environment as well as control strategies of different system components. The system is rarely in equilibrium. As an example, the polarization of a fuel cell depends not only on the current load request, but also on the pressure on the air and hydrogen side. Furthermore the system behaves quite differently at the same point in the load diagram during positive and negative load changes.

As a result, the task of on-board diagnostics is significantly more complex than the stationary diagnostics because of a series of confounding variables.

It is an object of the present invention to provide on-board diagnostics of such a system in real-time during normal driving which leads to lower maintenance costs, quicker response time for problem resolution and shorter design cycles.

According to the present invention, known adaptive techniques are applied to estimate static characteristic curves such as those observed in a workshop test facility based on observed, non-stationary everyday driving data. As a result, the aforementioned confounding variables are eliminated with a resulting estimated characteristic curve which can be compared to a reference curve.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
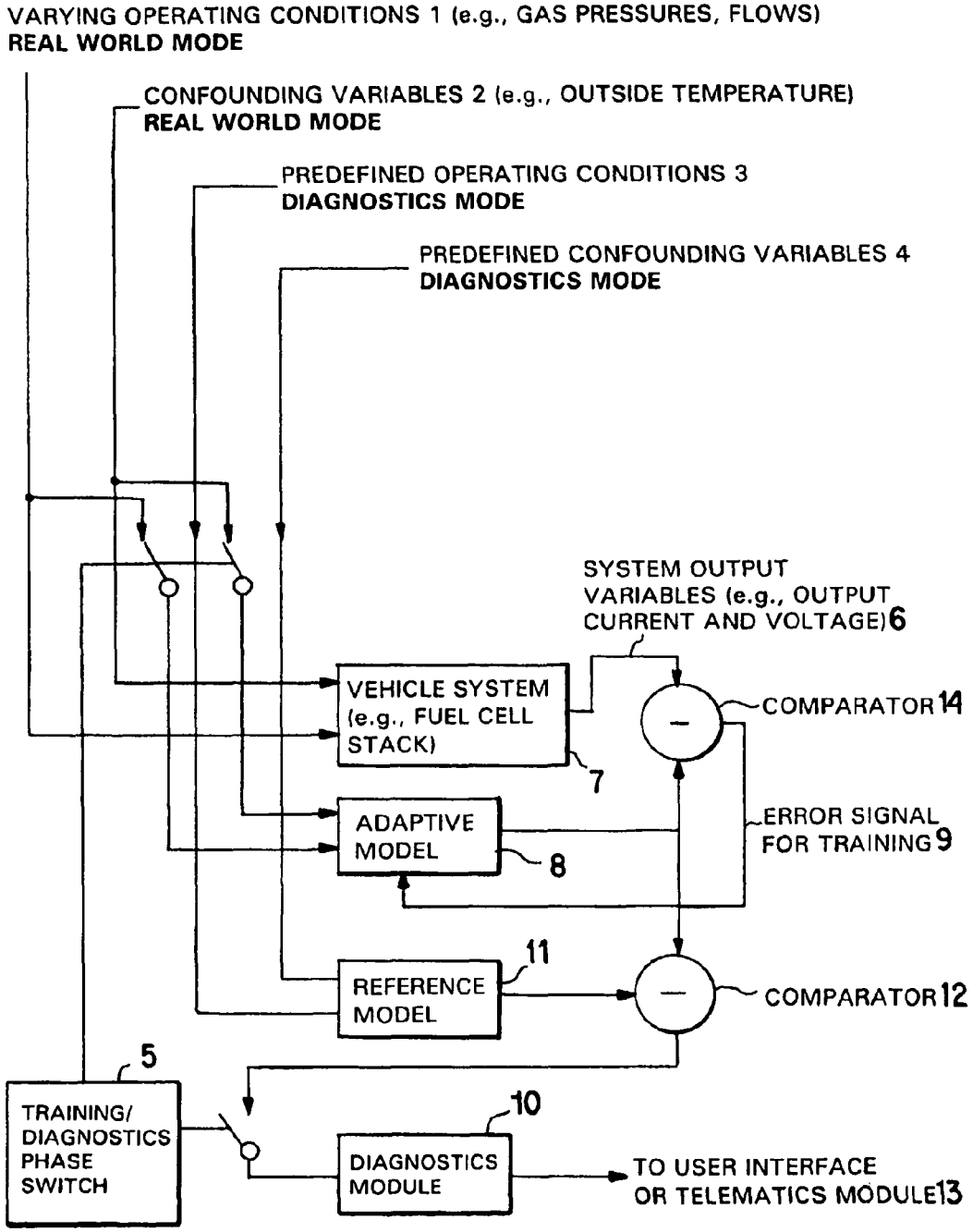
FIG. 1 illustrates a system architecture for providing real-time diagnostics according to the present invention.
Figure 2:
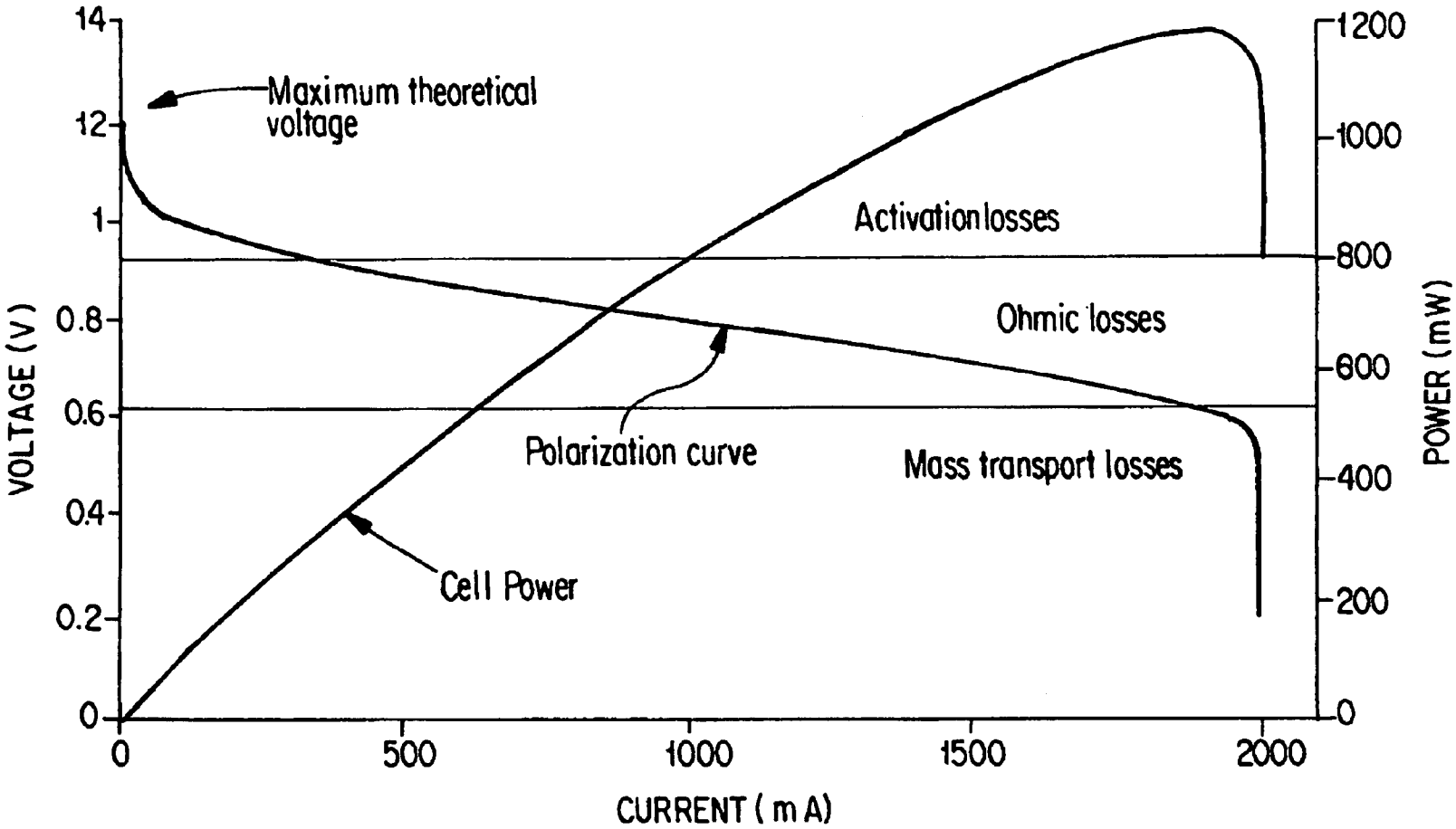
FIG. 2 is a polarization curve illustrating the effect of discharging current from a fuel cell system on the cell voltage and power.
Figure 3:
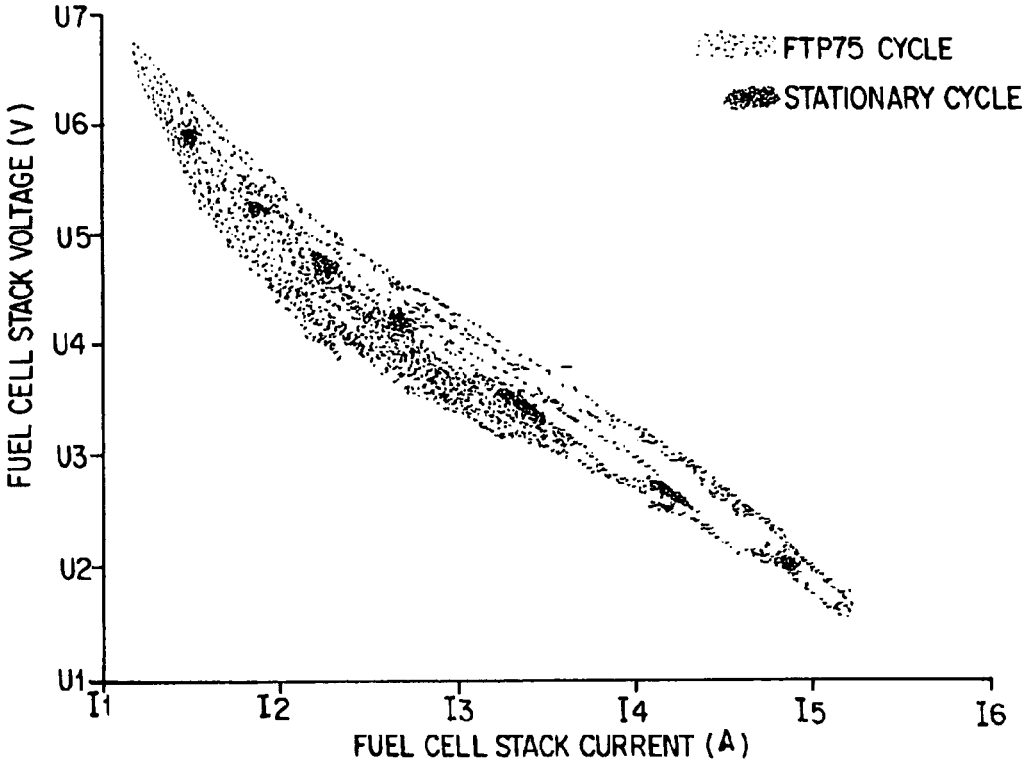
FIG. 3 illustrates a comparison of fuel cell voltage and current between a real-world driving cycle measurement and a stationary test measurement.

The reference model 11 of FIG. 1 contains a design specification for reference behavior of the vehicle component 7 in terms of prescribed output variables 6 which can include, for example, the fuel cell output, as a function of a number of independent and/or input variables 1. Examples of these input independent variables are gas pressures and gas flows. During normal driving operations, a number of additional confounding variables 2, such as the outside temperature, blur the clear functional relationship which would exist if the device were bench tested in a workshop.

The present invention has a goal of estimating the input-output behavior of the vehicle component operating under the reference input conditions, based on its currently observed behavior with varying environmental conditions. With such a predictive curve, the diagnostic module 12 functions to reduce the detected deviations from a stored "ideal" curve. The detection of these deviations is accomplished by the adaptive module component 8 which is implemented using any one of a series of machine learning techniques known in the art such as described in Principles of Data Mining (Adaptive Computation and Machine Learning) by David J. Hart et al and Data Mining: Practical Machine Learning Tools and Techniques with Java Implementation by Ian H. Witten and Eibe Franks. Generally speaking the learning component can be model-based, black-box, or a hybrid between these two extremes. Model based diagnosis has difficulty with complex technical systems because, even with a complete specification, it is difficult to tune the large number of parameters in order to realistically capture observed dependencies. The present invention uses an approach which employs general-purpose function modeling with an informed choice of the relevant input and output attributes. Therefore, by using adaptive curve fitting techniques in this manner it is possible to capture the "characteristic curves" of a system while also having the added benefit of being able to be used in multidimensional spaces as well as for continuous ranges of all input variables. In a particular embodiment for fuel cell application, the present invention uses the class of three-layer feed-forward neural networks.

The learning component is fed not only with the characteristic independent variables 1, but also with the confounding variables 2 (such as outside temperature). The system is able to assume an online learning scenario where training and diagnostics phases are interleaved using switch 5. The adaptive model 8 constantly tracks the current input-output behavior with the difference comparator 14, providing the difference between the predicted output and the actual system output. The difference signal is used as the error signal 9 for training. In order to reduce the amount of computation, it is sufficient that the learning mechanism be triggered only when the average error is constantly increasing and eventually exceeds a given threshold.

The diagnostics phase only occurs when the average error is below the threshold. This indicates that the adaptive component 8 accurately models the real system 7. Diagnostics can be performed in regular time intervals or by explicit request from a user. The derived functional model 8 is able to indicate how the system would behave under prespecified conditions of the workshop test bed. In order to provide this function, the functional model 8 is fed values for the confounding variables 4 according to the specification of the workshop tests while varying the independent variables 3 in order to study its simulated output. In the instance of fuel cell diagnostics, this can be achieved by setting the stack temperature and the differential pressure (hydrogen to air side) to a fixed value for a certain output power or by using the same exact values for input variables as previously seen under workshop conditions. On the basis of the comparison by comparator 12 between a reference curve and the estimated curve, the diagnostics module 10 can either inform the driver using a Human Machine Interface (HMI) or send the result of the analysis to a data center using wireless communication where it can, in turn, be fed back to technicians and design engineers.

Figure 4:
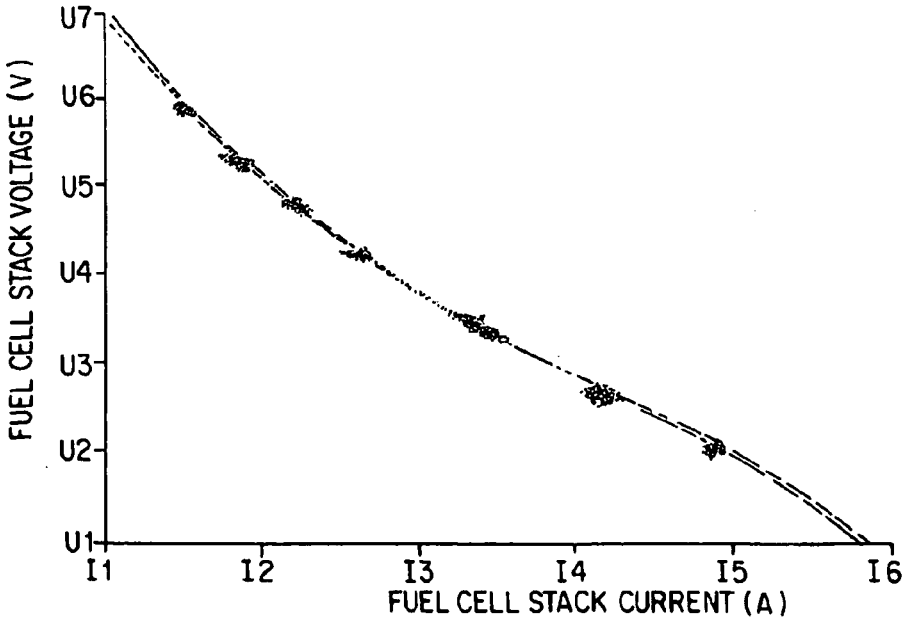
FIG. 4 illustrates a comparison of data from a stationary test and from neural network prediction during real-world operation, according to the present invention.

A comparison of the stationary test data recorded on the workshop test bed with values estimated by the neural network which was trained with everyday driving data recorded on the same day as the workshop test is shown in FIG. 4. The same input data is fed into each test. From the location of the areas of uncertainty, as far as their size and shape, it is to be noted that there is quite an accurate agreement between the two tests. Upon interpolation of both sets of data the resulting curves are satisfactory for diagnostic purposes because having a narrow band or a single line as a reference only requires minor onboard diagnostics algorithms to determine if the current real time powertrain data provides a tolerance band indicating "satisfactory" or "healthy" conditions.

The above described onboard diagnostic enables a speed-up in the development cycle of new technologies because design engineers can be provided feedback data concerning wear, tear and failure of the monitored system in an expedited manner. Furthermore, user support and acceptance can be increased by early warning and reduced down time (predictive maintenance). Therefore, service intervals can be adjusted to actual service demand which is particular important for emerging and not yet completely mature technologies such as fuel cell cars. Additionally, the present system allows for onboard diagnostics with a significant data reduction compared to complete data recording, which is the method typically used with research fleets. Additionally, due to the automated operation, the high labor cost for manual post processing of data is significantly reduced.

The continuously created models of the powertrain in the adaptive model 8 can be transmitted over a wireless connection to a central fleet database for the purpose of observing each individual vehicle and the vehicle fleet as a whole, which is part of a statistical approach. The present system contributes to each of the goals by enabling feasible and robust on-board diagnostics systems.

The foregoing disclosure has been set forth merely to illustrate the invention and is not intended to limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for on-board real-time diagnostics of a system, said method comprising the steps:

providing a reference model containing predefined operating conditions and predefined confounding variables of said system and outputting a reference characteristic;

measuring real-world operating conditions and real-world confounding variables of said system and outputting a plurality of *actual* system output variables, *wherein the real-world confounding variables comprise variables indicating a state of an environment of the system*;

providing an adaptive model input with said real-world operating conditions and said real-world confounding variables in a first phase and inputting said predefined operating conditions and said predefined confounding variables in a second phase;

providing a first comparator for comparing said plurality of *actual* system output variables with an output of said adaptive model;

*providing* feedback means for feeding the output of said first [comparative] *comparator directly* to an input of said adaptive model during said first phase;

providing a second comparator to compare the output of said adaptive model during the second phase with said reference characteristic output of said reference model, *wherein the reference characteristic comprises a characteristic output curve for the system based on the reference model, and wherein the output of the adaptive model comprises a predicted output curve for the system based on the adaptive model*;

providing a diagnostics module receiving the output of said second comparator during said second phase in order to output a diagnosis of said system.

2. The method according to claim 1, further including the step of switching between said first phase and said second phase wherein said first phase is a training phase and said second phase is a diagnostics phase.

3. The method according to claim 1, wherein said reference characteristic is a series of measured response functions generated by a stationary test of said system.

4. The method according to claim 3, wherein said measured response function provides a polarization curve generated by a stationary test of a fuel cell powertrain.

5. The method according to claim 3, wherein said measured response function provide a speed/torque curve generated by a stationary test of an internal combustion engine.

6. The method according to claim 1, wherein said system is a fuel cell powertrain.

7. The method according to claim 1, wherein said real-world operating conditions and said real-world confounding variables are generated when a vehicle containing said system is being driven during normal operation.

8. The method according to claim 1, wherein said system is a mobile technical system of a vehicle.

9. An arrangement for real time diagnostics of a system, comprising:

a reference model [receiving] *configured to receive* predefined operating conditions and predefined confounding variables of said system and outputting a reference characteristic;

[means for inputting] *an input mechanism configured to input* to said system real-world operating conditions and real-world confounding variables of said system wherein the output of said system provides *actual* system output variables;

an adaptive model [receiving] *configured to receive*, in a first phase, said real-world operating conditions and said real-world confounding variables and, in a second phase said pre-defined operating conditions and said pre-defined confounding variables to provide a first output during said first phase and a second output during said second phase;

*a* first comparator [means for comparing] *configured to compare* said *actual* system output variables with said first output of said adaptive model;

*a* feedback [means receiving] *mechanism configured to receive* an output of said first comparator [means] and [feeding] *feed* said output *directly* to said adaptive model during said first phase;

*a* second comparator [means for comparing] *configured to compare* an output of said reference model with the second output of said adaptive model during said second phase*, wherein the output of said reference model comprises a characteristic output curve for the system based on said reference model, and wherein the second output of said adaptive model comprises a predicted output curve for the system based on said adaptive model*;

a diagnostics module [receiving] *configured to receive* an output of said second comparator during said second phase; *and*

*a* switching [means for switching] *mechanism configured to switch* between said first and second phase.

10. The arrangement according to claim 9, wherein said first phase is a training phase and said second phase is a diagnostics phase.

11. The arrangement according to claim 9, wherein said reference characteristics are a series of measured response functions generated by a stationary test of said system.

12. The arrangement according to claim 11, wherein said measured response functions provide a polarization curve generated by a stationary test of a fuel cell powertrain.

13. The arrangement according to claim 11, wherein said measured response functions provide speed/torque curve generated by a stationary test of an internal combustion engine.

14. The arrangement according to claim 9, wherein said system is a fuel cell powertrain.

15. The arrangement according to claim 9, wherein said real-world operation conditions and said real-world confounding variables are generated from a measuring means during the normal driving operation of a vehicle containing said system.

*16. A method comprising:*

*receiving, by a processing device, an actual-system output from a vehicle component;*

*adapting, by the processing device, an adaptive model in a training phase in response to a received error signal, wherein the received error signal is received at the adaptive model, wherein the received error signal is a difference between a predicted output of the adaptive model and the actual-system output, and wherein the difference is used to train the adaptive model;*

*generating, by the processing device, the predicted output in a diagnostic phase based on a received set of diagnostic conditions;*

*switching, by the processing device, between the training phase and the diagnostic phase;*

*when in the diagnostic phase:*

*comparing, by the processing device, a reference output from a reference model to the predicted output, wherein the reference output comprises a characteristic output curve for the vehicle component based on the reference model, and wherein the predicted output comprises a predicted output curve for the vehicle component based on the adaptive model; and*

*providing, by the processing device, an indication based on the comparison.*

*17. The method of claim 16 wherein the adaptive model utilizes adaptive curve fitting.*

*18. The method of claim 16 wherein the adaptive model utilizes a three-layer feedforward neural network.*

*19. The method of claim 16 wherein the adaptive model is trained only when the received error is above a threshold.*

*20. The method of claim 16 further comprising transmitting the adaptive model to a database.*

*21. The method of claim 16 wherein the switching between the training phase and the diagnostic phase is in response to a request.*

*22. The method of claim 16 wherein the switching between the training phase and the diagnostic phase occurs according to a schedule.*

*23. A real-time diagnostic device, comprising:*

*a vehicle component, configured to provide an actual-system output;*

*an adaptive model, configured to:*

*generate a predicted output in a training phase by adjusting the adaptive model in response to a received error signal, wherein the received error signal is received at the adaptive model, wherein the received error signal is a difference between the predicted output of the adaptive model and the actual-system output, and wherein the difference is used to train the adaptive model;*

*generate the predicted output in a diagnostic phase based on a received set of diagnostic conditions;*

*switch between the training phase and the diagnostic phase;*

*a reference model, configured to: generate a reference output;*

*a comparator, configured to:*

*compare the predicted output in the diagnostic phase to the reference output, wherein the reference output comprises a characteristic output curve for the vehicle component based on the reference model, and wherein the predicted output in the diagnostic phase comprises a predicted output curve for the vehicle component based on the adaptive model, and*

*provide an indication based on the comparison.*

*24. The device of claim 23 wherein the adaptive model is configured to use curve fitting.*

*25. The device of claim 23 wherein the adaptive model is configured to use neural networks.*

*26. The device of claim 23 further comprising a diagnostics module for transmitting the adaptive model to a server.*

*27. The method of claim 16, wherein switching between the training phase and the diagnostic phase comprises switching to the diagnostic phase only when an average error corresponding to the received error signal is below a threshold.*

*28. The method of claim 16, further comprising triggering the training phase only when an average error corresponding to the received error signal is increasing and exceeds a threshold.*

*29. The method according to claim 1, wherein the real-world confounding variables comprise at least an outside temperature.*

*30. The method according to claim 1, wherein the providing the adaptive model input with said predefined operating conditions and said predefined confounding variables in the second phase further comprises:*

*setting said predefined confounding variables to a fixed value; and*

*varying said predefined operating conditions.*

*31. The method according to claim 1, wherein during the second phase:*

*the characteristic output curve is further based on said predefined operating conditions and said predefined confounding variables, and*

*the predicted output curve is further based on said predefined operating conditions and said predefined confounding variables.*

*32. The device of claim 23, wherein the adaptive model is further configured to switch to the diagnostic phase only when the received error signal is below a threshold, and wherein the received error signal being below a threshold indicates that the adaptive model accurately models the actual-system output from the vehicle component.*

* * * * *